(12) United States Patent
Matsuo

(10) Patent No.: US 10,360,544 B2
(45) Date of Patent: Jul. 23, 2019

(54) INFORMATION PROCESSING SYSTEM, INFORMATION PROCESSING APPARATUS, AND INFORMATION PROCESSING METHOD

(75) Inventor: Takashi Matsuo, Tokyo (JP)

(73) Assignee: Sony Corporation, Tokyo (JP)

( * ) Notice: Subject to any disclaimer, the term of this patent is extended or adjusted under 35 U.S.C. 154(b) by 2132 days.

(21) Appl. No.: 12/350,516

(22) Filed: Jan. 8, 2009

(65) Prior Publication Data

US 2009/0177556 A1 Jul. 9, 2009

(30) Foreign Application Priority Data

Jan. 9, 2008 (JP) .................................. 2008-001937

(51) Int. Cl.
*G06Q 20/12* (2012.01)
*G06Q 30/06* (2012.01)
*H04N 21/2547* (2011.01)
*H04N 21/472* (2011.01)
*G06F 16/951* (2019.01)

(52) U.S. Cl.
CPC ......... *G06Q 20/123* (2013.01); *G06F 16/951* (2019.01); *G06Q 30/0601* (2013.01); *G06Q 30/0641* (2013.01); *G06Q 30/0643* (2013.01); *H04N 21/2547* (2013.01); *H04N 21/47211* (2013.01)

(58) Field of Classification Search
CPC ............... G06Q 30/0641; G06Q 30/06; G06Q 30/0643; G06Q 30/00; G06Q 30/0601; G06Q 20/123

USPC ............ 705/64, 76, 26.1, 26.2, 26.63, 26.8, 705/26.81, 26.82, 27.1, 27.2
See application file for complete search history.

(56) References Cited

U.S. PATENT DOCUMENTS 5,915,019 A * 6/1999 Ginter et al. .................... 705/54
6,996,563 B2 * 2/2006 Kumagai ................ G06F 21/10
(Continued)

FOREIGN PATENT DOCUMENTS

JP 2002-074202 A 3/2002
JP 2002-269508 A 9/2002
(Continued)

OTHER PUBLICATIONS

Office Action from Japanese Application No. 2008-001937 dated Mar. 30, 2010.

*Primary Examiner* — Steven S Kim
(74) *Attorney, Agent, or Firm* — Chip Law Group

(57) ABSTRACT

A system effectively performs content information acquisition processing and content purchase processing in which it is necessary to access different servers. If a user views information provided by an information providing server, for example, television program table information, and acquires content related to information selected from among pieces of information included in the television program table information, the user can transmit a content acquisition request including content specification information to a content providing server simply by dragging and dropping the selected information displayed on a display screen onto a toolbar included in a display unit or onto another server information display area. As a result, the user can effectively perform the selection and acquisition of content without switching between connections to various servers.

9 Claims, 15 Drawing Sheets

(56) References Cited

U.S. PATENT DOCUMENTS

| | | | |
|---|---|---|---|
| 7,039,605 B2* | 5/2006 | Kuwahara et al. | 705/26.81 |
| 7,047,416 B2* | 5/2006 | Wheeler et al. | 713/182 |
| 7,103,575 B1* | 9/2006 | Linehan | 705/64 |
| 7,249,056 B1* | 7/2007 | Crouthamel | G06Q 30/06 705/26.41 |
| 7,315,830 B1* | 1/2008 | Wirtz et al. | 705/14.1 |
| 7,430,524 B2* | 9/2008 | Shah et al. | 705/26.8 |
| 7,523,214 B2* | 4/2009 | Kikkawa | H04N 21/4627 709/230 |
| 7,698,167 B2* | 4/2010 | Batham et al. | 705/26.62 |
| 7,725,356 B2* | 5/2010 | Shah et al. | 705/27.1 |
| 7,788,712 B2* | 8/2010 | Hong et al. | 726/9 |
| 7,809,652 B2* | 10/2010 | Dixon et al. | 705/76 |
| 7,877,295 B2* | 1/2011 | Mengerink et al. | 705/26.8 |
| 8,224,702 B2* | 7/2012 | Mengerink | G06Q 20/10 705/26.8 |
| 8,255,488 B2* | 8/2012 | Tanaka | G06Q 30/02 709/219 |
| 8,280,777 B2* | 10/2012 | Mengerink | G06Q 20/10 705/26.1 |
| 2001/0029492 A1* | 10/2001 | Uchikata | 705/64 |
| 2001/0049635 A1* | 12/2001 | Chung | 705/26 |
| 2001/0049664 A1* | 12/2001 | Kashino et al. | 705/52 |
| 2002/0016745 A1* | 2/2002 | Kuwahara et al. | 705/26 |
| 2002/0029342 A1* | 3/2002 | Keech | 713/184 |
| 2002/0077921 A1* | 6/2002 | Morrison et al. | 705/26 |
| 2002/0082953 A1* | 6/2002 | Batham et al. | 705/27 |
| 2002/0152137 A1* | 10/2002 | Lindquist et al. | 705/27 |
| 2003/0130906 A1* | 7/2003 | Maari | 705/26 |
| 2003/0163431 A1* | 8/2003 | Ginter et al. | 705/64 |
| 2003/0210279 A1* | 11/2003 | Masuda | 345/810 |
| 2004/0078287 A1* | 4/2004 | Yang | 705/26 |
| 2004/0215574 A1* | 10/2004 | Michelsen et al. | 705/64 |
| 2005/0010486 A1* | 1/2005 | Pandhe | 705/26 |
| 2005/0273444 A1* | 12/2005 | Delgrosso et al. | 705/76 |
| 2006/0009944 A1* | 1/2006 | Shah et al. | 702/123 |
| 2006/0031768 A1* | 2/2006 | Shah et al. | 715/735 |
| 2006/0179129 A1* | 8/2006 | Clayton | H04L 67/06 709/220 |
| 2006/0224397 A1* | 10/2006 | Morris et al. | 705/1 |
| 2006/0235760 A1* | 10/2006 | Sanjar et al. | 705/26 |
| 2008/0061142 A1* | 3/2008 | Howcroft | H04N 5/44591 235/386 |
| 2008/0092157 A1* | 4/2008 | Walter | H04N 7/17354 725/25 |
| 2008/0154738 A1* | 6/2008 | Jain et al. | 705/26 |
| 2008/0306876 A1* | 12/2008 | Horvath et al. | 705/76 |
| 2009/0132389 A1* | 5/2009 | Klinger | G06Q 30/02 705/26.1 |

FOREIGN PATENT DOCUMENTS

| | | |
|---|---|---|
| JP | 2006106768 A | 4/2006 |
| JP | 2007172161 A | 7/2007 |

* cited by examiner

FIG. 5

| USER ID (CARD ID) | CONTENT ID |
|---|---|
| 00000001 | CONTENT A |
| | CONTENT B |
| | CONTENT D |
| 00000002 | CONTENT B |
| | CONTENT C |
| 00000003 | CONTENT A |

FIG. 10

| KEYWORD | AVAILABLE CONTENT | CONTENT PURCHASE SITE URL INFORMATION (OPTIONAL) |
|---|---|---|
| ARTIST 1 | ALBUM 1-1 | http://www.*.*** |
|  | ALBUM 1-2 | http://www.*.*** |
|  | ALBUM 1-3 | http://www.*.*** |
| ARTIST 2 | ALBUM 2-1 | http://www.*.*** |
|  | ALBUM 2-2 | http://www.*.*** |
|  | ALBUM 2-3 | http://www.*.*** |
|  | ALBUM 2-4 | http://www.*.*** |
| ARTIST 3 | ALBUM 3-1 | http://www.*.*** |

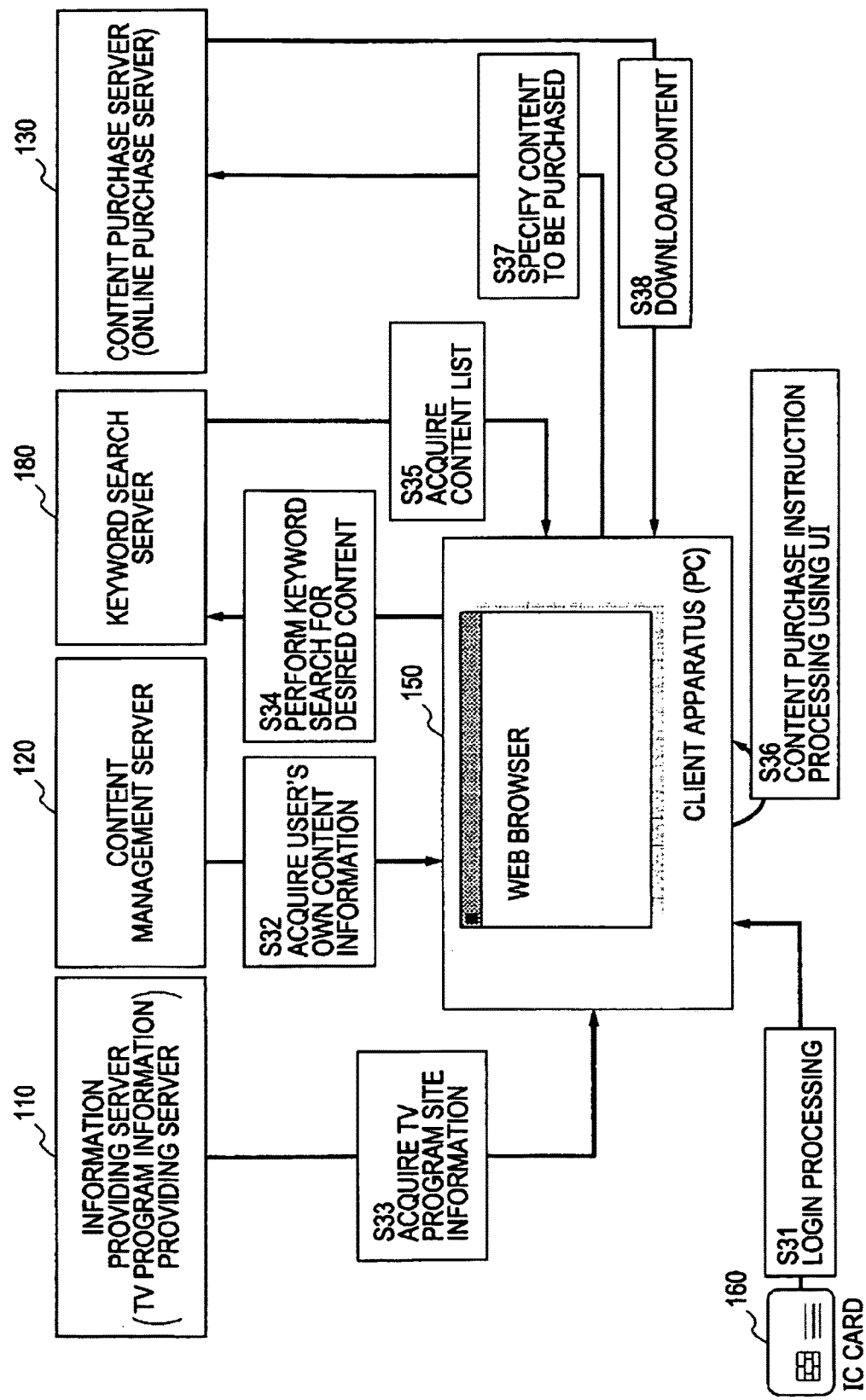

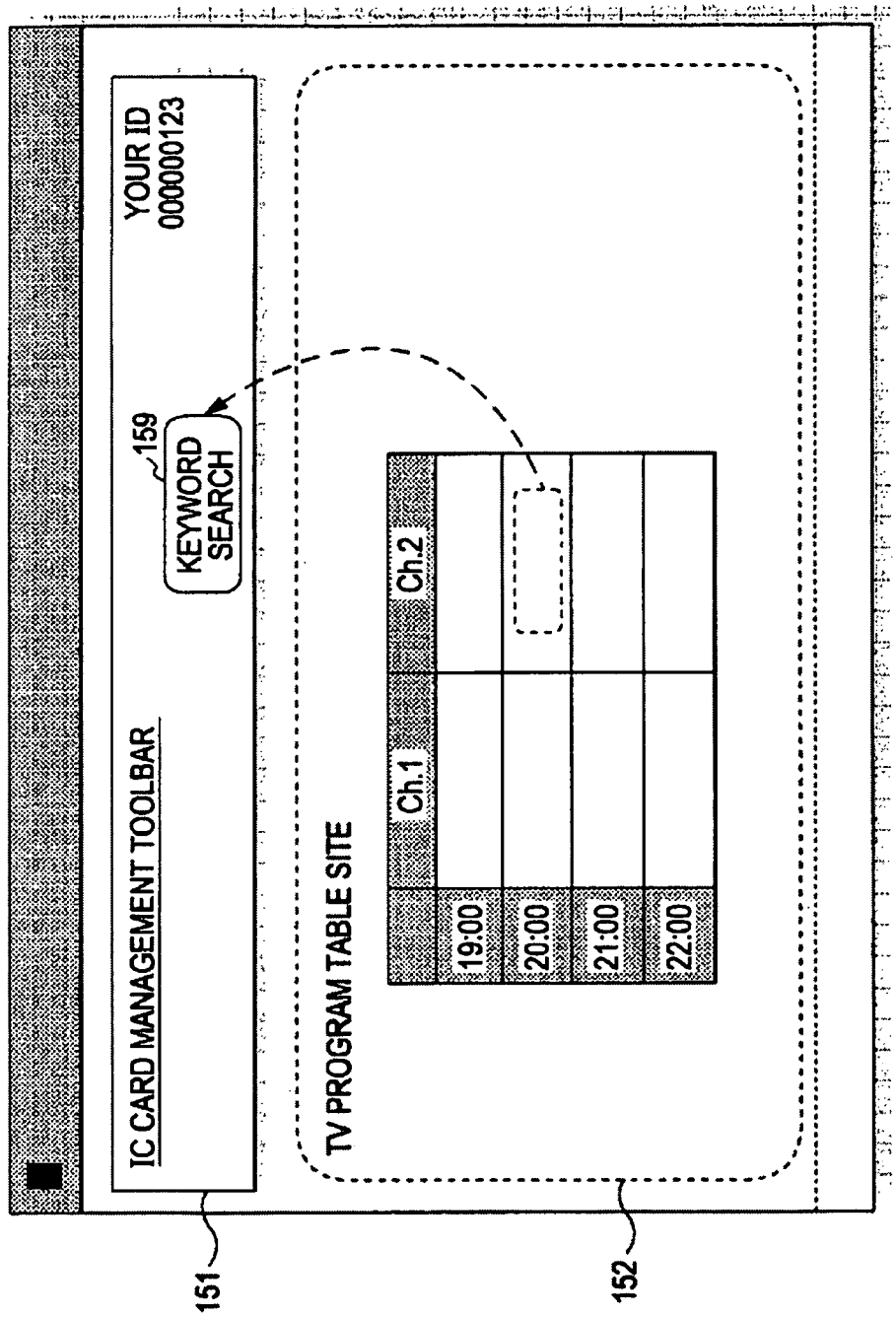

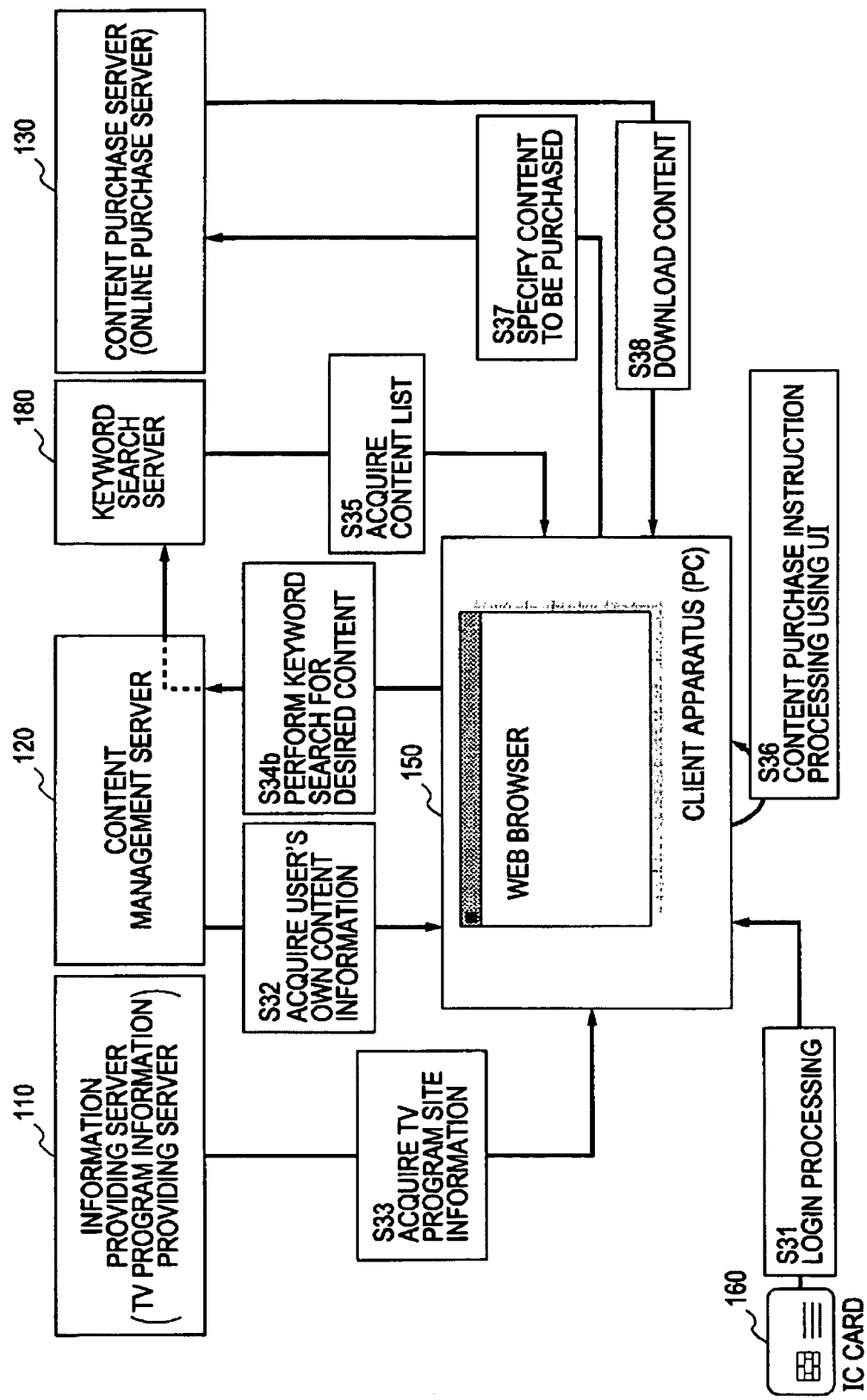

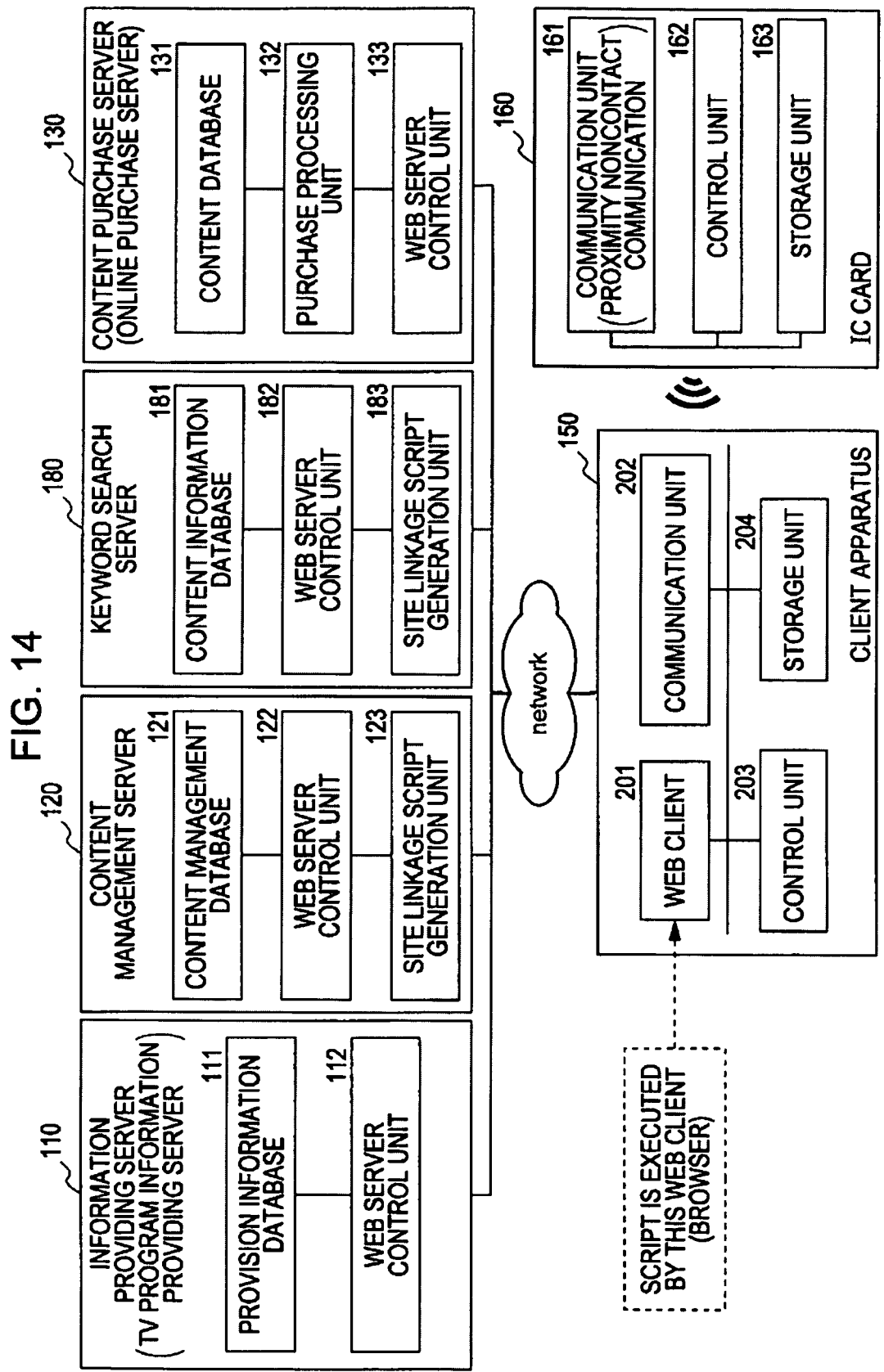

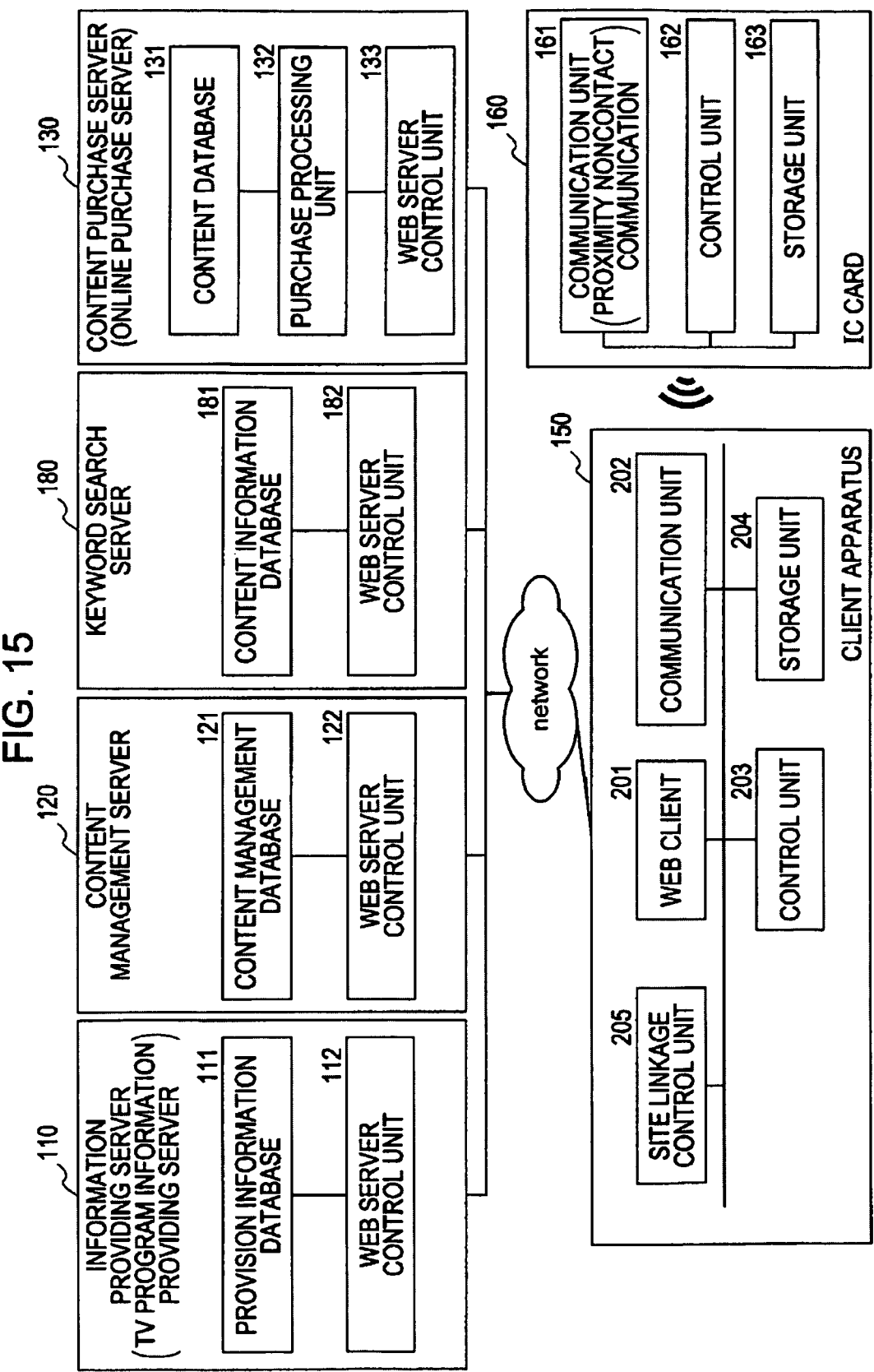

INFORMATION PROCESSING SYSTEM, INFORMATION PROCESSING APPARATUS, AND INFORMATION PROCESSING METHOD

CROSS-REFERENCE TO RELATED APPLICATIONS

This application claims the benefit of the filing date of Japan Patent Application No. JP2008-001937 filed on Jan. 9, 2008, the disclosure of which is hereby incorporated herein by reference.

FIELD OF THE TECHNOLOGY

The present invention relates to information processing systems, information processing apparatuses, information processing methods, and computer programs, and, more particularly, to an information processing system, an information processing apparatus, and an information processing method allowing a user to smoothly check the user's owned content or purchase content, and a computer program.

Furthermore, the present invention relates to an information processing system, an information processing apparatus, and an information processing method allowing a user to smoothly check the user's owned content or purchase content using an IC card or a portable terminal with an IC card function, and a computer program.

BACKGROUND OF THE TECHNOLOGY

Information distribution via a network is frequently performed. On the Web, various pieces of information or data such as map information, TV program table information, music information, and movie information are supplied from various information-providing sites. Information-providing portal sites may be customized for each user. For example, each user can log into a portal site by inputting a user ID or password that are registered in advance.

If pieces of information unique to each user, for example, favorite music information, favorite movie content information, and pieces of information about URLs of sites providing the music information and the movie content information, are registered in advance in a user portal site, the user can instantly access a desired one of these sites via the portal. Thus, the portal can provide a user-friendly environment.

Such a portal site has customized or separate settings for different users. In order to access such a portal site, it is necessary for each user to input user information such as a user ID or a password. Alternatively, it is necessary for each user to hold the user's IC card or the user's portable terminal with an IC card function over a PC with a reader/writer (R/W) function. In this case, the PC reads out user information registered in the IC card and accesses such a portal site using the read user information.

For example, Japanese Unexamined Patent Application Publication No. 2002-269508 discloses a system in which an IC card is held against or over a PC with a reader/writer (R/W) function, information stored in the IC card is output to the PC, and then the information is displayed on a display screen of the PC.

Currently, a service for storing user data in a server such as a particular user's owned content and managing the stored user data is available. For example, there is a content storage and management service that allows a user to transmit (upload) content (music, image, or video content) acquired via a network or acquired from a medium such as a DVD or CD to a content management server. The content can be downloaded from the content management server when necessary. With such a service, it is unnecessary for a client to have its own storing means for long term storing of the content. The client can manage content using only a general purpose Web browser.

As described previously, various pieces of information such as TV program table information, music information, and movie information are provided on the Web. When a user views such pieces of information, the user may want to purchase music content, movie content, TV program content, or TV theme song content. However, an information-providing site is not directly linked to a content-purchase site in many cases. Accordingly, if the user finds content that the user wants to purchase on an information-providing site, it is necessary for the user to access another content-purchase site, find the content that the user wants to purchase, and perform a purchase process for the content with the content-purchase site.

That is, it is necessary for the user to perform a complicated process of accessing an information-providing site, viewing the information-providing site, checking content information such as the title of content that the user wants to purchase, accessing a content-purchase site, retrieving the content that the user wants to purchase, and performing a purchase process for the retrieved content. If the user cannot find the content that the user wants to purchase in the accessed content-purchase site, it is necessary for the user to repeatedly perform the above-described process, that is, access another site to retrieve the content that the user wants to purchase. This inefficient process frequently occurs.

BRIEF SUMMARY OF THE TECHNOLOGY

The present invention has been made in view of the above-described problems. It is an object of embodiments of the present invention to provide an information processing system, an information processing apparatus, and an information processing method allowing a user to smoothly check the user's owned content or purchase content, and a computer program.

Furthermore, it is an object of embodiments of the present invention to provide an information processing system, an information processing apparatus, and an information processing method allowing a user to smoothly check the user's owned content or purchase content using an IC card or a portable terminal with an IC card function, and a computer program.

According to a first aspect of some embodiments of the present invention, an information processing system includes: a content management server for managing content of a client; an information-providing server for performing information providing processing for the client; and a client apparatus for displaying pieces of information provided by the information-providing server in a first data display area in a display unit and transmitting to the content management server or a content-purchase server a content purchase request including content specification information generated on the basis of information that is selected from among the pieces of information and dragged and dropped into a second data display area in the display unit.

In an embodiment of an information processing system according to the present invention, the client apparatus reads out a user ID from an IC card, transmits the user ID to the content-management server, and displays information provided by the content-management server in the display unit.

In an embodiment of an information processing system according to the present invention, the client apparatus reads out a password or an electronic certification from an IC card, transmits the password or the electronic certification to the content-management server, and displays information provided by the content-management server in the display unit.

In an embodiment of an information processing system according to the present invention, the client apparatus displays an IC card management toolbar in the second data display area and transmits to the content-management server or a content-purchase server a content purchase request including content specification information generated on the basis of information that is selected from among the pieces of information displayed in the first data display area and dragged and dropped into the IC card management toolbar.

In an embodiment of an information processing system according to the present invention, the client apparatus reads out a user ID from an IC card, transmits the user ID to the content-management server, displays information provided by the content-management server in the second data display area, and transmits to the content-management server or a content-purchase server a content purchase request including content specification information generated on the basis of information that is selected from among the pieces of information displayed in the first data display area and dragged and dropped into the second data display area.

In an embodiment of an information processing system according to the present invention, the client apparatus reads out a password or an electronic certification from an IC card, transmits the password or the electronic certification to the content-management server, displays information provided by the content-management server in the second data display area, and transmits to the content-management server or a content-purchase server a content purchase request including content specification information generated on the basis of information that is selected from among the pieces of information displayed in the first data display area and dragged and dropped into the second data display area.

In an embodiment of an information processing system according to the present invention, the content-management server provides for the client information about a program for transmitting to the content-management server or a content-purchase server a content purchase request including content specification information generated on the basis of information selected from among the pieces of information displayed in the first data display area.

In an embodiment of an information processing system according to the present invention, the information processing system further includes a keyword search server for receiving a keyword search request from the client apparatus and providing a result of keyword searching for the client apparatus.

According to a second aspect of the present invention, an information processing apparatus for performing content acquisition processing includes: a display unit for displaying information; a control unit for performing data processing on the basis of information about an operation performed for information displayed in the display unit; and a communication unit for performing network communication. The control unit displays pieces of information provided by an information providing server in a first data display area in the display unit and transmits via the communication unit to a content management server or a content purchase server a content purchase request including content specification information generated on the basis of information that is selected from among the pieces of information and dragged and dropped into a second data display area in the display unit.

In an embodiment of an information processing apparatus according to the present invention, the information processing apparatus further includes a proximity communication unit for reading out a user ID from an IC card. The control unit transmits the user ID acquired from the IC card to the content-management server and displays information provided by the content-management server in the display unit.

In an embodiment of an information processing apparatus according to the present invention, the information processing apparatus further includes a proximity communication unit for reading out a password or an electronic certification from an IC card. The control unit transmits the password or the electronic certification acquired form the IC card to the content-management server and displays information provided by the content-management server in the display unit.

In an embodiment of an information processing apparatus according to the present invention, the information processing apparatus displays an IC card management toolbar in the second data display area and transmits to the content-management server or a content-purchase server a content purchase request including content specification information generated on the basis of information that is selected from among the pieces of information displayed in the first data display area and dragged and dropped into the IC card management toolbar.

In an embodiment of an information processing apparatus according to the present invention, the information processing apparatus reads out a user ID from an IC card, transmits the user ID to the content-management server, displays information provided by the content-management server in the second data display area, and transmits to the content-management server or a content-purchase server a content purchase request including content specification information generated on the basis of information that is selected from among the pieces of information displayed in the first data display area and dragged and dropped into the second data display area.

In an embodiment of an information processing apparatus according to the present invention, the information processing apparatus reads out a password or an electronic certification from an IC card, transmits the password or the electronic certification to the content-management server, displays information provided by the content-management server in the second data display area, and transmits to the content-management server or a content-purchase server a content purchase request including content specification information generated on the basis of information that is selected from among the pieces of information displayed in the first data display area and dragged and dropped into the second data display area.

According to a third aspect of the present invention, an information processing method of performing content acquisition processing in an information processing apparatus includes: a displaying step of causing a control unit to display pieces of information provided by an information-providing server in a first data display area in a display unit; and a data processing step of causing the control unit to transmit via a communication unit to a content-management server or a content-purchase server a content purchase request including content specification information generated on the basis of information that is selected from among the pieces of information and dragged and dropped into a second data display area in the display unit.

In an embodiment of an information processing method according to the present invention, the information processing method further includes the steps of: reading out a user ID from an IC card via a proximity communication unit, and causing the control unit to transmit the user ID acquired from the IC card to the content-management server and display information provided by the content-management server in the display unit.

In an embodiment of an information processing method according to the present invention, the information processing method further includes the steps of: reading out a password or an electronic certification from an IC card via the proximity communication unit, and causing the control unit to transmit the password or the electronic certification acquired from the IC card to the content-management server and display information provided by the content-management server in the display unit.

In an embodiment of an information processing method according to the present invention, the information processing method further includes the step of causing the control unit to display an IC card management toolbar in the second data display area. The data processing step is a step of transmitting to the content-management server or a content-purchase server a content purchase request including content specification information generated on the basis of information that is selected from among the pieces of information displayed in the first data display area and dragged and dropped into the IC card management toolbar.

In an embodiment of an information processing method according to the present invention, the information processing method further includes the steps of: reading out a user ID from an IC card via the proximity communication unit; and causing the control unit to transmit the user ID to the content-management server and display information provided by the content-management server in the second data display area. The data processing step is a step of transmitting to the content-management server or a content-purchase server a content purchase request including content specification information generated on the basis of information that is selected from among the pieces of information displayed in the first data display area and dragged and dropped into the second data display area in which the information provided by the content-management server is displayed.

In an embodiment of an information processing method according to the present invention, the information processing method further includes the steps of: reading out a password or an electronic certification from an IC card via the proximity communication unit; and causing the control unit to transmit the password or the electronic certification to the content-management server and display information provided by the content-management server in the second data display area. The data processing step is a step of transmitting to the content-management server or a content-purchase server a content purchase request including content specification information generated on the basis of information that is selected from among the pieces of information displayed in the first data display area and dragged and dropped into the second data display area in which the information provided by the content-management server is displayed.

According to a fourth embodiment of the present invention, a computer program or process causing an information processing apparatus to perform content acquisition processing includes: a displaying step of causing a control unit to display pieces of information provided by an information-providing server in a first data display area in a display unit; and a data processing step of causing the control unit to transmit via a communication unit to a content-management server or a content-purchase server a content purchase request including content specification information generated on the basis of information that is selected from among the pieces of information and dragged and dropped into a second data display area in the display unit.

Here, a computer program or process according to an embodiment of the present invention can be provided to, for example, a versatile or general purpose computer system capable of executing various programs, software applications or program codes via a computer-readable storage medium or a communication medium. By providing such a program to the computer system in a computer-readable format, processing corresponding to the program is performed or executed by one or more processors in the computer system.

In some embodiments a storage medium stores computer readable data comprising processor control instructions for a computer apparatus to perform a method of content acquisition processing. The storage medium may include control instructions to generate a graphic user interface comprising a first data display area and a second data display area, the first data display area representing data content units of a first server. The storage medium may also include control instructions to control the graphic user interface to accept as an input a drag and drop operation to the second data display area of a visual element associated with the first data display area, the visual element representing data concerning a particular content unit of the first data display area. The storage medium may also include control instructions to initiate a transmission in response to the drag and drop operation. The transmission may comprise the generation of a content purchase request to a second server. The content purchase request may represent a request for a content unit associated with the particular content unit.

Other objects, characteristics, and advantages of the present invention will become apparent from more detailed descriptions based on the following embodiments of the present invention and the accompanying drawings. In this specification, a system means a logical group of a plurality of apparatuses. These apparatuses may not be in the same cabinet.

According to an embodiment of the present invention, if a user views information provided by an information providing server, for example, television program table information, and acquires content related to information selected from among pieces of information included in the television program table information, the user can transmit a content acquisition request including content specification information to a content-providing server only by dragging and dropping the selected information displayed on a display screen onto a toolbar included in a display unit or onto another server information display area. As a result, the user can effectively perform the selection and acquisition of content without switching between connections to various servers.

BRIEF DESCRIPTION OF THE DRAWINGS

An information processing system, an information processing apparatus, and an information processing method according to example embodiment of the present invention and a computer program will be described in detail below with reference to the accompanying drawings.

FIG. 5 is a diagram describing an example of management data of a content-management server;

FIG. 10 is a diagram describing exemplary management data of a keyword search server;

FIG. 11 is a diagram describing a configuration of an information processing system according to the second embodiment of the present invention and a process performed in the information processing system;

FIG. 12 is a diagram describing a data display or graphic user interface example of a client apparatus;

FIG. 13 is a diagram describing an example modification of a configuration of an information processing system according to the second embodiment of the present invention and an exemplary modification of a process performed in the information processing system;

FIG. 14 is a diagram describing an example configuration of components included in an information processing system of the present technology; and FIG. 15 is a diagram describing an example configuration of components included in an information processing system of the present technology.

DETAILED DESCRIPTION

Figure 1:
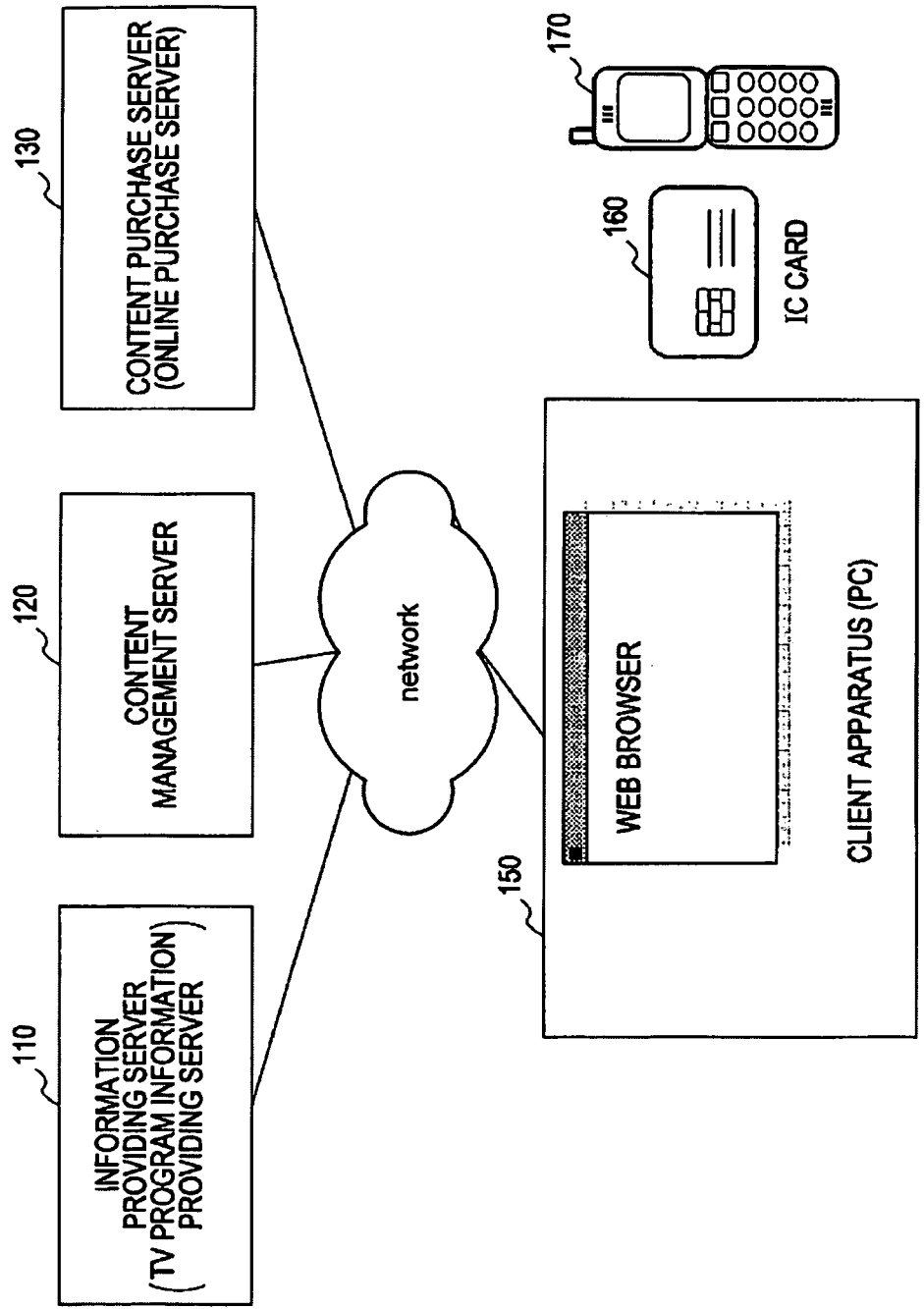
FIG. 1 is a diagram describing an example configuration of an information processing system according to a first embodiment of the present invention.

FIG. 1 illustrates an example configuration of an information processing system of the present technology. An information providing server 110 is a server for providing various pieces of information such as television program table information, music content information, and video content information. In the following discussion, for the embodiments with the information providing server 110, the server is configured for providing television program table information. However, it will be understood that the server may be implemented to provide other content in this and other embodiments.

A content-management server 120 is a server that provides a service for storing user content and managing the stored user content. A client apparatus 150 is a user terminal such as a PC or computer with a programmable processor, memory/data storage and input/output components (e.g., display, keypad, mouse, touch screen etc.). The content-management server 120 can upload or download the user content or perform streaming reproduction of the user content when it is being accessed by the client apparatus 150. For example, the content-management server 120 can also offer a service that provides a list in which pieces of music content are arranged in accordance with genres and a service for retrieving content using an artist name.

A content-purchase server 130 is a server that performs content purchase processing for purchasing music content or video content. The server can purchase a user's desired content upon receiving user information, purchase content information and payment information from the client apparatus 150. The client apparatus 150 can download content from the content-purchase server 130 so as to acquire the content.

The client apparatus 150 is an information processing apparatus such as a PC (e.g., a computer with a programmable processor, memory/data storage and input/output components like a display, keypad, mouse, touch screen etc.) or portable terminal owned by a user. The client apparatus 150 has a network communication function and a function of communicating with an IC card 160, that is, a reader/writer (R/W) function. The IC card 160 is a card that is capable of performing proximity communication or data transfer and is provided with an IC having a communication function for performing communication in a contact or non-contact manner, for example, an RFIC (Radio Frequency IC).

In some embodiments, a portable terminal 170 such as a portable telephone with an IC card function may be used instead of a card-type IC card. In some of the following embodiments, an example case with an IC card is described. However, in other embodiments, features of the described IC card can involve a terminal that serves an IC card function.

Figure 2:
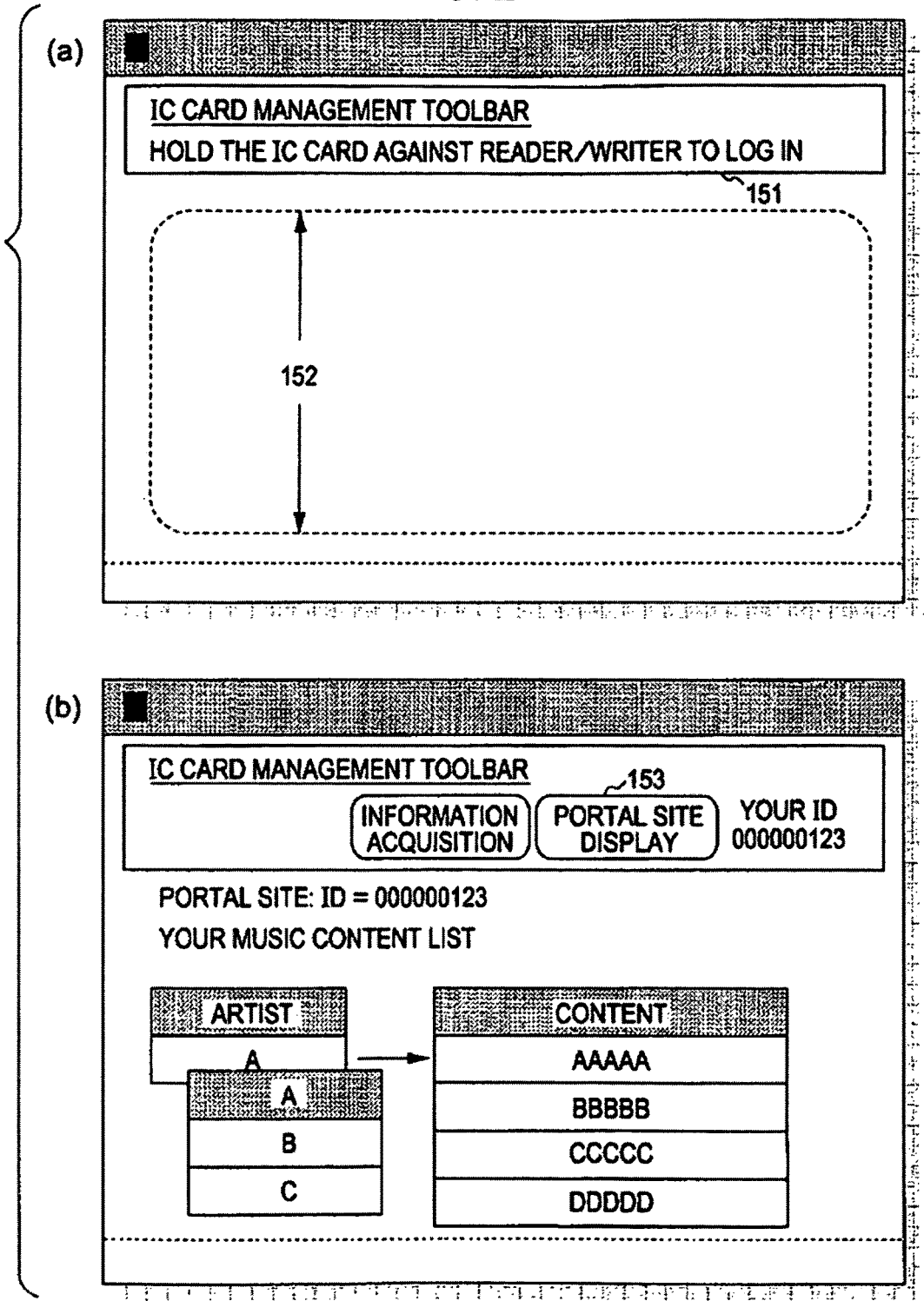
FIG. 2 is a diagram describing a data display or graphic user interface example of a client apparatus.
Figure 3:
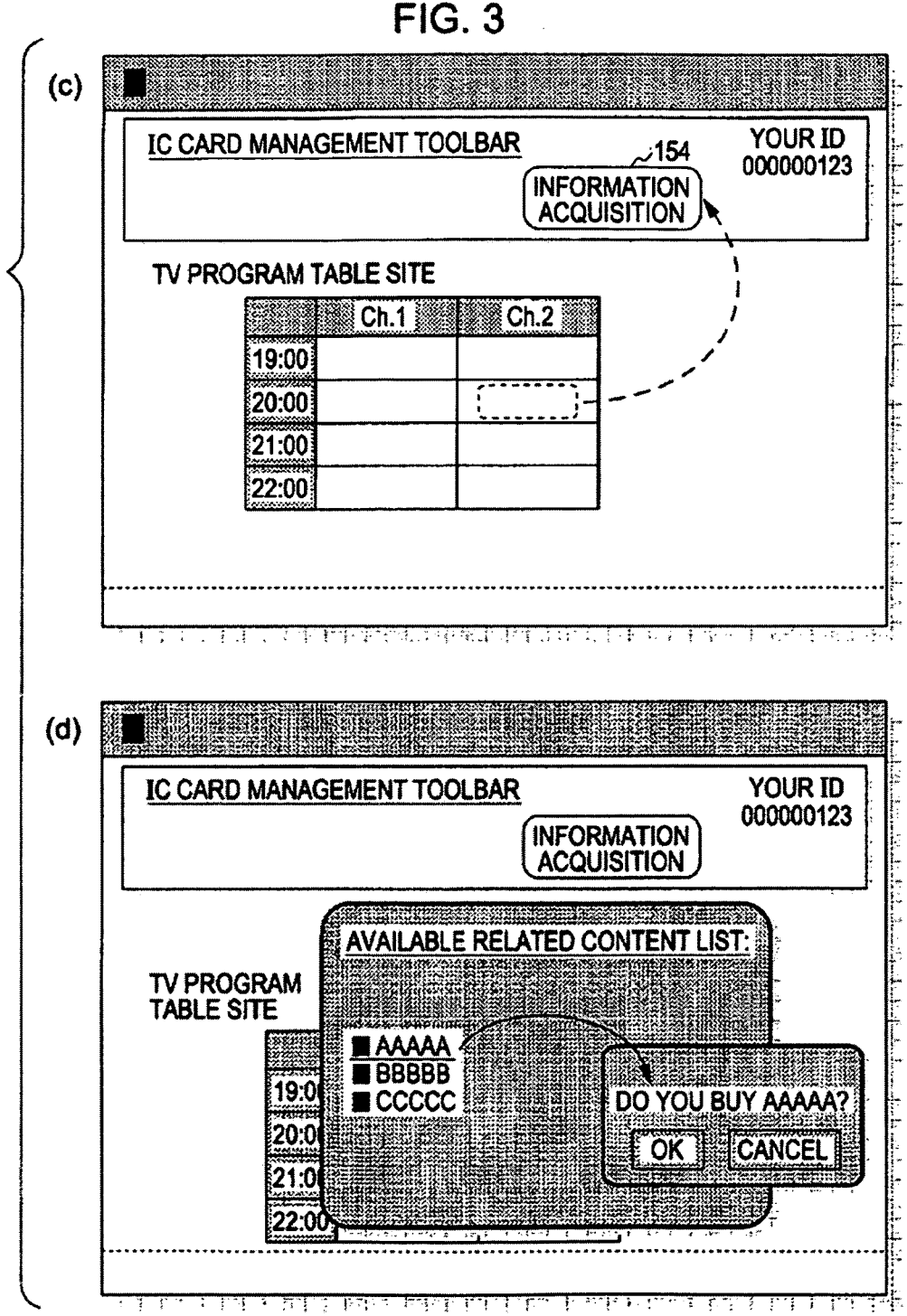
FIG. 3 is a diagram describing a data display or graphic user interface example of a client apparatus.

A process according to the present invention will be described with reference to FIG. 2 and the subsequent drawings. FIGS. 2 and 3 illustrate a user interface with pieces of data displayed on the display screen of the client apparatus 150. Operations with the interface in the client apparatus may be considered in chronological order from (a) to (d) in FIGS. 2 and 3.

FIG. 2(a) illustrates an initial screen displayed on the display screen of the client apparatus 150. The graphic display serves as a graphic user interface. These graphic displays may be generated under the control of a processor with stored data and processor control instructions (e.g., software of web browser) from a memory or storage medium of the client apparatus, which may be in part downloaded from a server (e.g., a web page data and/or script data). In conjunction with the graphic display, the client apparatus is responsive to input from user with an input device that is also controlled by processor control instructions and a processor of the client apparatus. On the initial screen, an IC card management toolbar 151 is displayed on a toolbar display area, and information provided by the information-providing server 110, the content-management server 120 or the content-purchase server 130 is displayed on a server information display area 152 outside the toolbar display area.

By dragging and dropping display data such as an icon displayed in the server information display area 152 onto an icon displayed in the IC card management toolbar 151, by the user manipulating an input device for example, the dragged and dropped display data is set as an input parameter and processing corresponding to the icon displayed in the IC card management toolbar 151 is performed using the input parameter. For example, a program or processor control instructions associated with the icon displayed in the IC card management toolbar 151 is executed, whereby processing for transmitting the data displayed in the server information display area 152 to another server is performed under control of a processor of the client apparatus.

The client apparatus 150 has a configuration in which processing for displaying server information using a browser and processing for displaying the IC card management toolbar 151 and executing software or a program associated with an icon displayed in the IC card management toolbar 151 can be concurrently performed.

FIG. 2(*a*) also illustrates an initial screen with a message requesting a user to hold the user's IC card against or over a reader/writer (R/W) included in the client apparatus. This message is displayed in the IC card management toolbar 151 to prompt a user. Alternatively, the user may have an IC card that can be inserted into the reader/writer (R/W), and data stored in the IC card may be read by the reader/writer (R/W). In this case, a message requesting a user to insert the user's IC card into a reader/writer (R/W) is displayed to prompt the user.

If a user holds the IC card 160 owned by the user against or over a reader-writer unit included in the client apparatus 150 in response to the request, login processing is performed by the client apparatus. In the login processing, the client apparatus 150 reads out a user ID from the IC card, and performs processing operations in accordance with a predetermined sequence. More specifically, the client apparatus 150 accesses the content-management server 120 by transmitting the user ID to the content-management server 120. As a result of the processing, the user can perform processing for acquiring the user's content stored in the content-management server 120. The client apparatus 150 stores access information, for example, the URL of the content-management server 120, in a memory in advance, and uses the access information. Alternatively, the client apparatus 150 may read out the access information from the IC card and use the read access information.

In the following example embodiments, the user ID is stored in an IC card and the user ID is read out from the IC card. However, a password or an electronic certification, for example, may be stored in an IC card instead of a user ID. The password or electronic certification may then be read out from the IC card. Thus, processing applying a password or an electronic certification instead of a user ID may be performed by the client apparatus.

Subsequently, if the user selects or clicks a portal site display button 153 that is an icon displayed in the IC card management toolbar 151, access to a portal site that has been set in advance as a portal site corresponding to a user ID of the user is performed and data of a list of the user's pieces of content managed by the content-management server 120 is transferred and displayed on the display screen of client apparatus as illustrated in FIG. 2(*b*). Using the list data, for example, the user can review or reproduce specified content.

FIG. 3(*c*) illustrates an example case in which the client apparatus 150 accesses the information-providing server 110 and displays information provided by the information-providing server 110. For example, in this embodiment television program table information is transferred from the information-providing server 110 for display on the client apparatus. Thus, a list of programs available on different channels is displayed. Program information includes program title information, cast information, and theme song information.

If the user wants to acquire content related to certain program information included in the television program table information, for example, a theme song or a photo book of a member of the cast, the user selects or clicks the program information of the graphic user interface and drags and drops the program information onto an information acquisition button 154 that is an icon displayed in the IC card management toolbar 151. This may be accomplished with an input device of the client apparatus such as a mouse or touch screen, etc. As a result of the processing, a program or processor control instructions associated with the information acquisition button 154 is executed, whereby the dragged and dropped program information or the ID of the dragged and dropped program information is transmitted to the content-management server 120.

Upon receiving the program information selected by the user or the ID of the program information, the content-management server 120 generates a list of available pieces of content related to the program information and transmits the generated list to the client apparatus 150. The list is displayed in the client apparatus 150 as illustrated in FIG. 3(*d*).

In conjunction with the content-purchase server 130, the content-management server 120 generates the list of available units or pieces of content on the basis of content information supplied from the content-purchase server 130 and transmits the generated list to the client apparatus 150. Along with the generated list, the content management server 120 transmits a program such as a script to be used for content-purchase processing to the client apparatus 150. If content purchase processing is performed using the script by a processor in the client apparatus 150, a content purchase request including content specification information is transmitted to the content-management server 120. Upon receiving the content purchase request from the client apparatus 150, the content-management server 120 transfers the content specification information and a user ID to the content-purchase server 130.

The content-purchase server 130 transmits content requested by the user to the client apparatus 150 in response to the content purchase request transferred via the content-management server 120.

Figure 4:
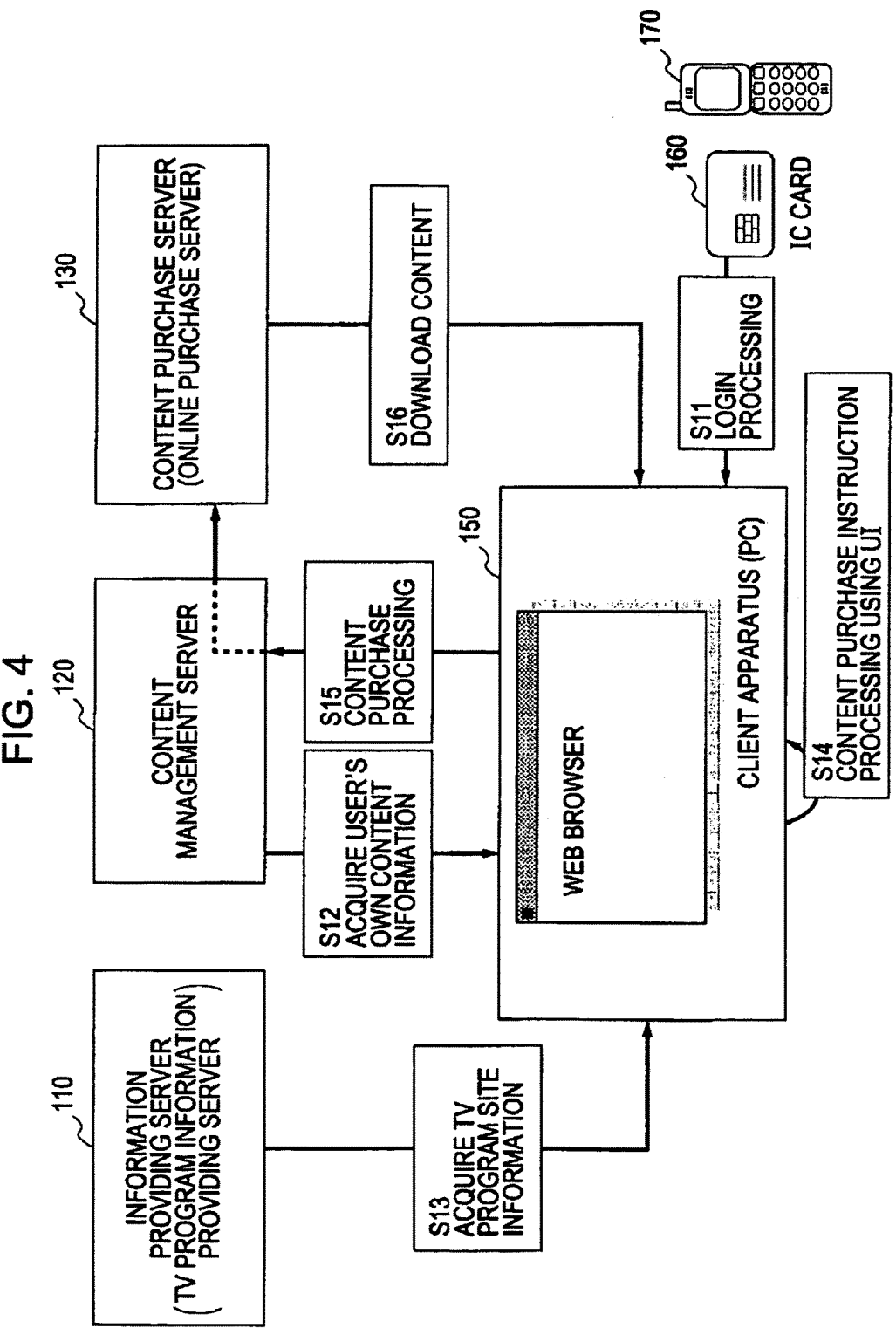
FIG. 4 is a diagram describing a configuration of an information processing system according to the first embodiment of the present invention and a process performed in the information processing system.

Next, the above-described content purchase processing sequence will be described with reference to FIG. 4. FIG. 4 illustrates processing steps (S11 to S16) in chronological order beginning with a login processing step (S11) in which a user logs into the client apparatus 150 using the IC card 160 through a content download processing step (S16) in which content is downloaded from the content purchase server 130. Each of processing steps will be described.

First, in step S11, a user performs login processing by holding the IC card 160 owned by the user against or over a reader/writer (R/W) included in the client apparatus 150.

As a result of the login processing, under control of a processor in the client apparatus, the client apparatus 150 reads out a user ID from the IC card. In step S12, the client apparatus 150 then accesses the content-management server 120 by transmitting the user ID to the content-management server 120 so as to acquire data of a list of the user's pieces of content managed by the content-management server 120. The client apparatus then displays the acquired list data on the display screen thereof. For example, the displayed data is as illustrated in FIG. 2(*b*).

The content-purchase server 130 manages units or pieces of content owned by many users by associating them with corresponding user IDs (card IDs). For example, as illustrated in FIG. 5, the content-purchase server 130 stores a content management table in which user IDs (card IDs) are individually associated with content IDs of units or pieces of content. For example, the content-purchase server may include or have access to a database and data storage components for these purposes.

Referring back to FIG. 4, in step S13, the user causes the client apparatus 150 to access the information-providing server 110 so as to acquire information provided by the information-providing server 110, for example, television program table information in this embodiment, and display the acquired information on the display screen of the client apparatus 150. For example, the client apparatus receives and displays a list of programs on channels that has been described with reference to FIG. 3(c). The program information may include program title information, cast information, and theme song information.

In step S14, the user makes a request to purchase content related to program information included in the television program table information, for example, a theme song. For example, the user specifies a song that is displayed as content related to the program information. In step S15, the user causes the client apparatus 150 to transmit information about the specified song to the content-management server 130. The above-described processing is content purchase request processing.

In purchase content determination processing, as described previously with reference to FIG. 3, the client apparatus 150 may communicate with the content-management server 120 so as to acquire content information associated with a selected program. That is, as described previously with reference to FIG. 3(c), a user selects or clicks program information and drags and drops the program information, by the user manipulating an input device for example, onto the information acquisition button 154 included in the IC card management toolbar so as to transmit the program information or the ID of the program information to the content-management server 120. The content management-server 120 generates a list of units or pieces of available content related to the program and transmits the generated list to the client apparatus 150. The list is displayed in the client apparatus 150 as illustrated in FIG. 3(d). Using the displayed data, the user performs the content purchase request processing. The content-management server 120 receives a content purchase request including content specification information.

Upon receiving the content purchase request including the content specification information, the content management-server 120 transfers the content specification information and a user ID to the content purchase server 130.

In step S16, the content-purchase server 130 transmits content requested by the user to the client apparatus 150 in response to the content purchase request transferred via the content-management server 120.

Figure 6:
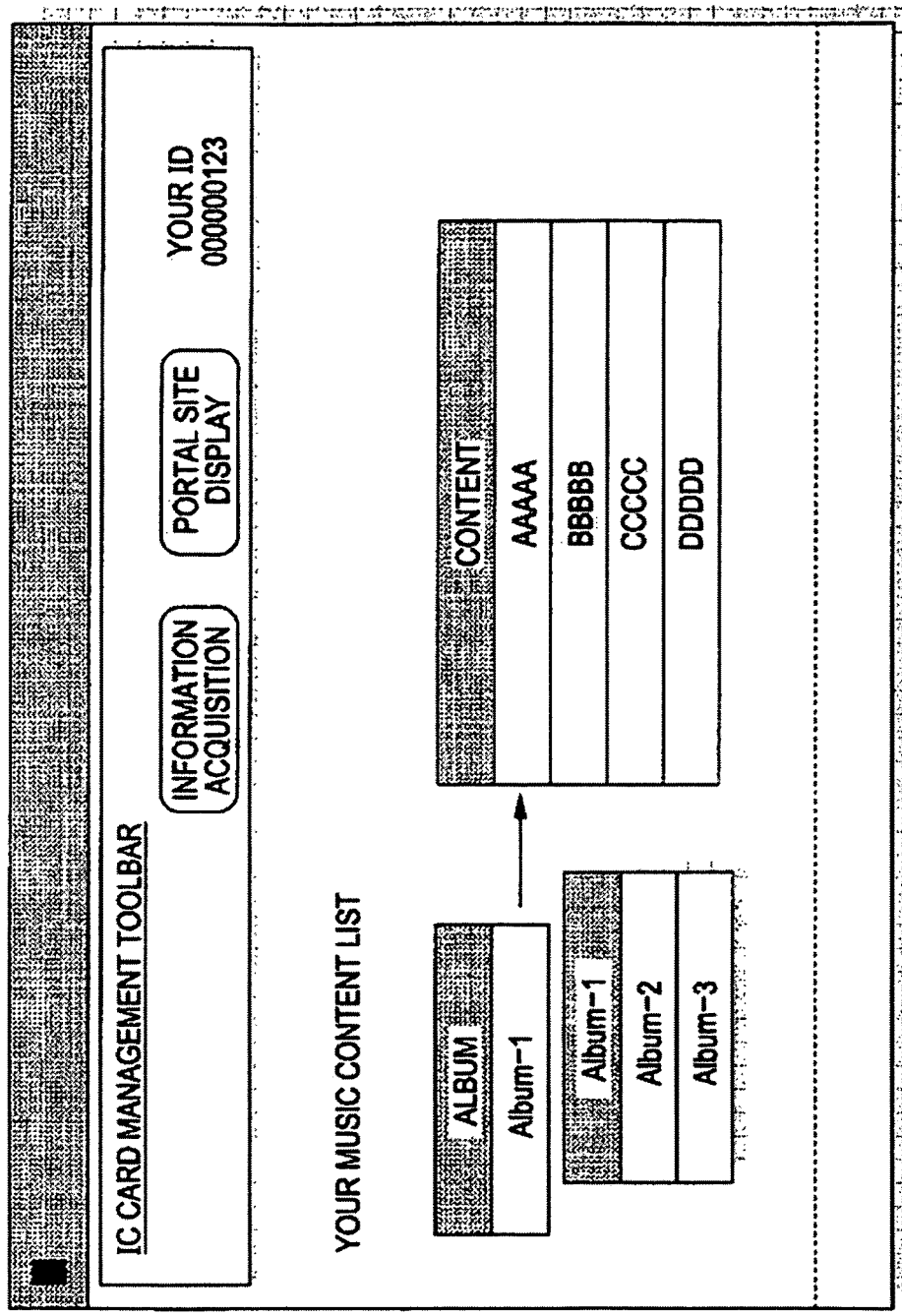
FIG. 6 is a diagram describing a data display or graphic user interface example of a client apparatus.

Examples of information displayed on the display screen of the client apparatus 150 have been described with reference to FIGS. 2 and 3. However, various types of data can be displayed. For example, FIG. 6 illustrates a list of units or pieces of content owned by the user which is provided by the content-management server 120. The list illustrated in FIG. 6 is similar to the list described previously with reference to FIG. 2(b).

Although FIG. 2(b) illustrates the content list in which pieces of content or content units are arranged in accordance with artists, FIG. 6 illustrates the content list in which pieces of content are arranged in accordance with albums. The content-management server 120 stores management data of pieces of content owned by the user. The content-management server 120 classifies the pieces of content that have been retrieved in response to a user's request into groups in various settings so as to generate a content list, and displays the generated content list.

Figure 7:
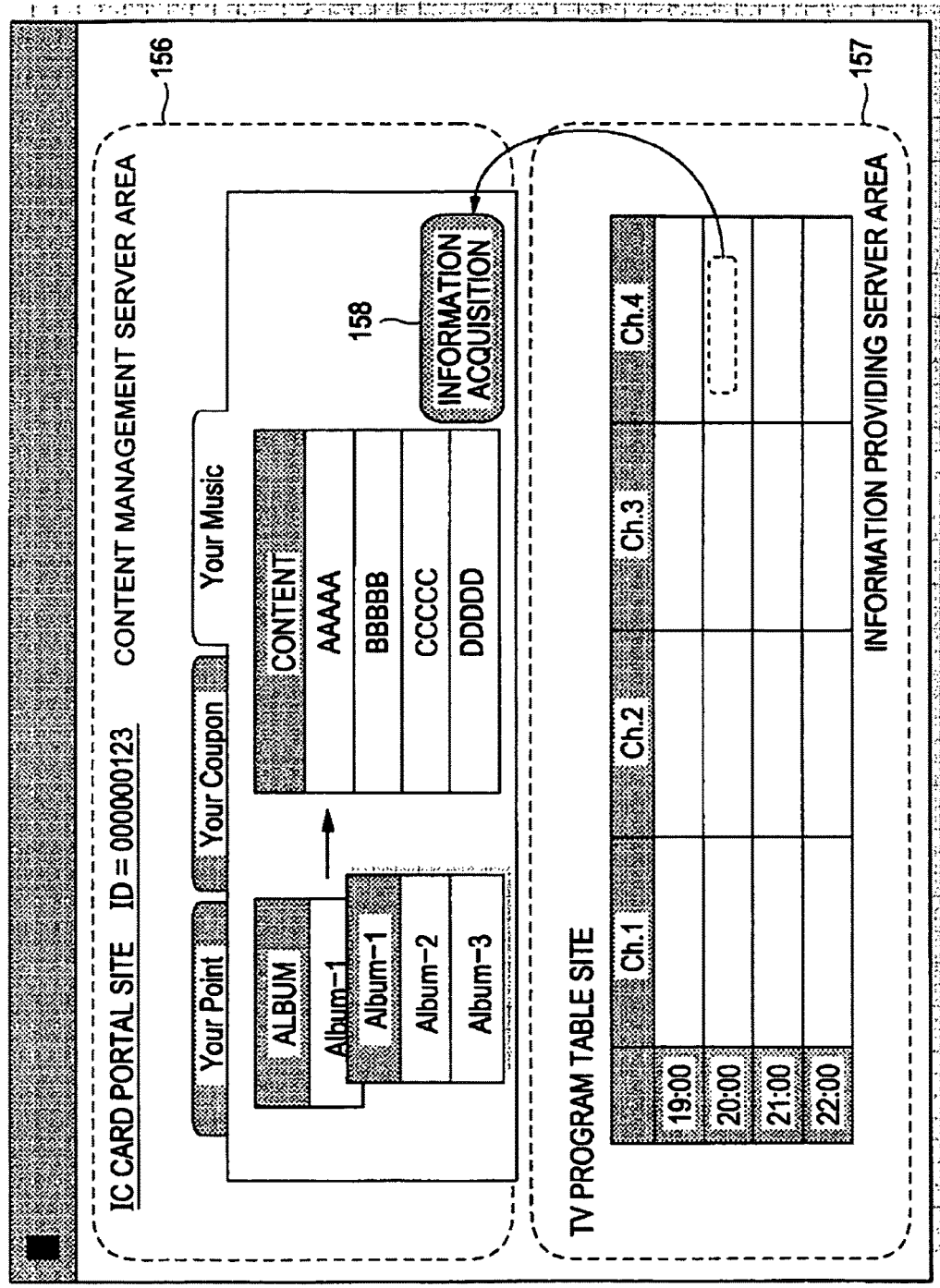
FIG. 7 is a diagram describing a data display or graphic user interface example of a client apparatus.

FIG. 7 illustrates a display example in which information provided by the content-management server 120 and information provided by the information-providing server 110 are displayed on a single screen or graphic user interface. In this display example, the IC card management toolbar, which has been described with reference to FIGS. 2 and 3, is not displayed, and pieces of information provided by two servers are displayed in parallel. In a content-management server area 156, information provided by the content-management server 120 is displayed. In an information-providing server area 157, information provided by the information-providing server 110 is displayed.

For example, if the user clicks or selects program information displayed in the information providing server area 157 and drags and drops the program information, by the user manipulating an input device for example, onto an information acquisition button 158 that is an icon displayed in the content management server area 156, a script (for example, Java (registered trademark) script) associated with the information acquisition button 158 is executed and processing for transmitting the dragged and dropped program information data to the content management server 120 is performed.

Thus, in a display unit included in the client apparatus 150, data can be displayed in various data formats.

In the processing sequence described previously with reference to FIG. 4, the content-management server 120 receives the content acquisition request from the client apparatus 150 and transfers the received content acquisition request to the content-purchase server 130. However, the content acquisition request may be directly transmitted from the client apparatus 150 to the content-purchase server 130.

Figure 8:
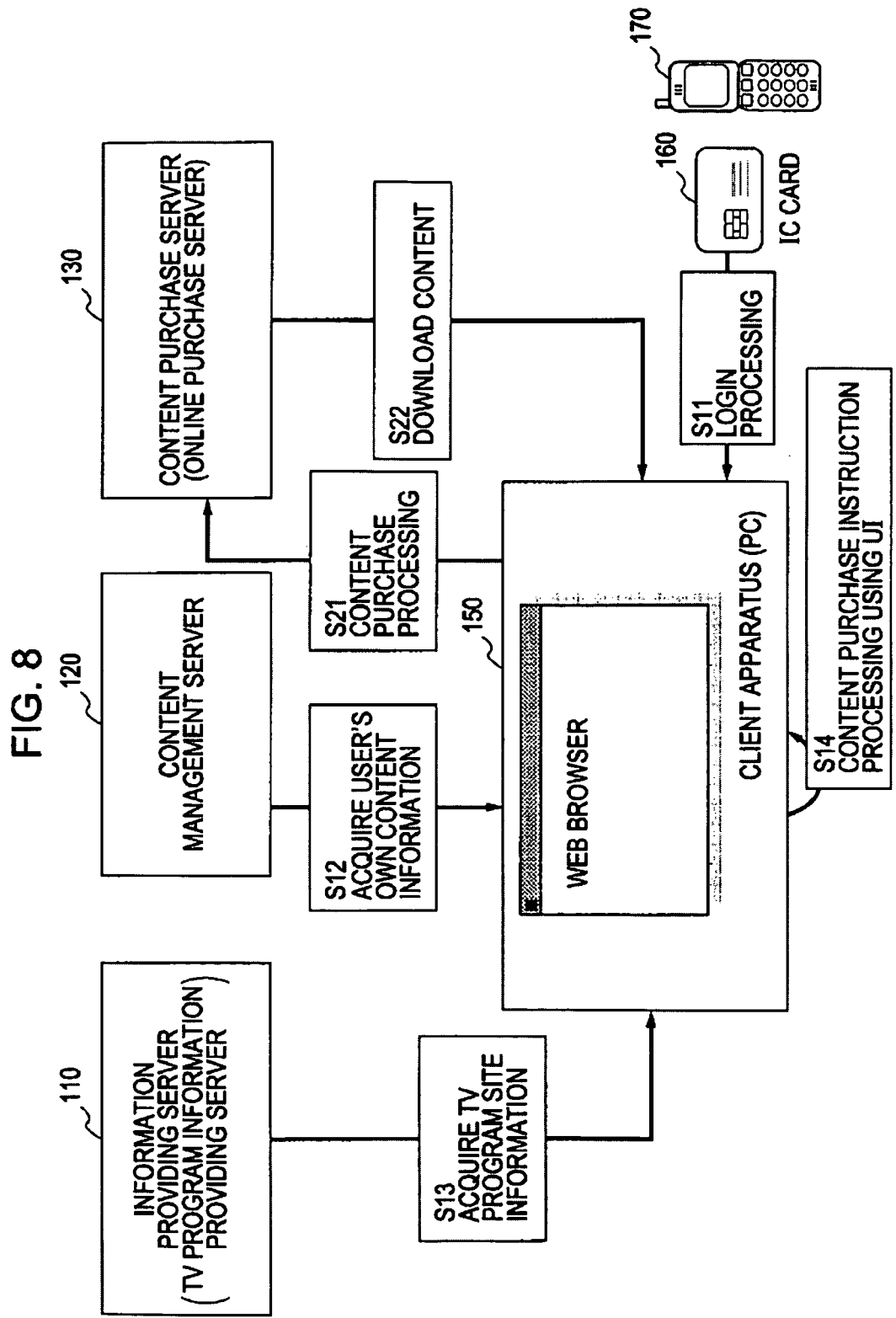
FIG. 8 is a diagram describing an example modification of a configuration of an information processing system according to the first embodiment of the present invention and an exemplary modification of a process performed in the information processing system.

That is, a processing sequence illustrated in FIG. 8 can be performed. The process from step S11 to step S14 illustrated in FIG. 8 is the same as the process from step 11 to step S14 described previously with reference to FIG. 4.

In an example case illustrated in FIG. 8, after processing has been performed in step S14, in step S21, a content acquisition request is transmitted from the client apparatus 150 to the content-purchase server 130. That is, although the content acquisition request is transmitted from the client apparatus 150 to the content-management server 120 in step S15 in the example case illustrated in FIG. 4, it is directly transmitted from the client apparatus 150 to the content-purchase server 130 in this example case. In step S22, the content-purchase server 130 transmits content to the client apparatus in response to the content purchase request.

For example, in the case described previously with reference to FIGS. 2 and 3, a server to which the content acquisition request is transmitted from the client apparatus 150 is determined on the basis of server specification information such as an URL specified by a program associated with an icon displayed in the IC card management toolbar, that is, the information acquisition button 154 illustrated in FIG. 3(c). By setting the content-management server 120 or the content purchase server 130 as the server specification information, a server to which the content acquisition request is transmitted from the client apparatus 150 can be changed.

In the example server information parallel display processing illustrated in FIG. 7, a server to which the content acquisition request is transmitted from the client apparatus 150 is determined on the basis of server specification information such as an URL specified by a program (for example, Java (registered trademark) script) associated with an icon displayed in the content management server area 156, that is, the information acquisition button 158. By setting the content-management server 120 or the content-purchase server 130 as the server specification information, a server to which the content acquisition request is transmitted from the client apparatus 150 can be changed.

Figure 9:
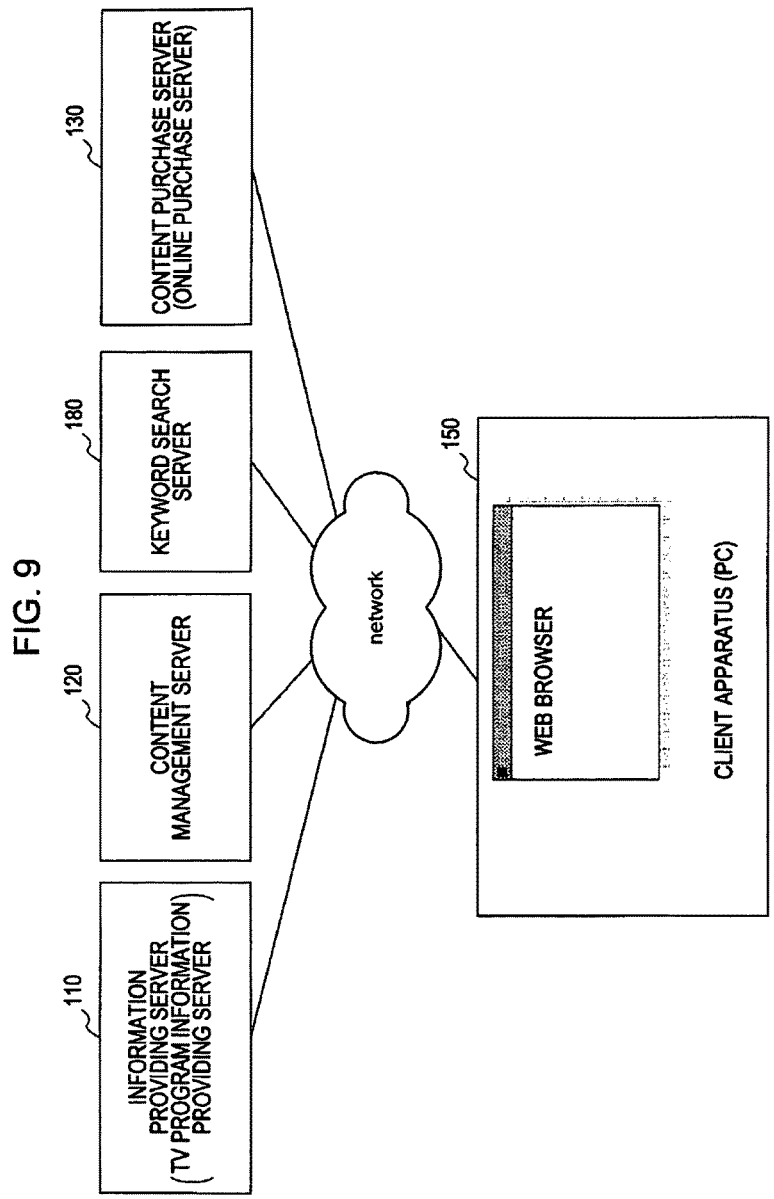
FIG. 9 is a diagram describing an example configuration of an information processing system according to a second embodiment of the present invention.

An information processing system according to the second embodiment of the present invention will be described with reference to FIG. 9 and the subsequent drawings. As can be recognized from the comparison between FIG. 9 and FIG. 1, an information processing system according to the second embodiment includes a keyword search server 180 in addition to components included in an information processing system according to the first embodiment.

The information-providing server 110, the content-management server 120, the content-purchase server 130, and the client apparatus 150 included in an information processing system according to the second embodiment are similar to the information-providing server 110, the content-management server 120, the content-purchase server 130, and the client-apparatus 150 included in an information processing system according to the first embodiment, respectively. The information-providing server 110 is a server for providing various pieces of information such as television program table information, music content information, and video content information. In this embodiment, description will be made under the assumption that the information-providing server 110 is a server for providing television program table information.

The content-management server 120 is a server for providing a service for storing user content and managing the stored user content. The client apparatus 150 is a user terminal such as a PC. The content management server 120 can upload or download the user content when being accessed by the client apparatus 150. For example, the content-management server 120 also offers a service for providing a list in which, for example, information concerning pieces of music content or audio files are arranged in accordance with genres and a service for retrieving content using an artist name.

The content-purchase server 130 is a server for performing content purchase processing for purchasing music content or video content, and can purchase user's desired content upon receiving user information, purchase content information, and payment information from the client apparatus 150. The client apparatus 150 can download content from the content-purchase server 130 so as to acquire the content.

The client apparatus 150 is, for example, a PC owned by a user, and has a network communication function and a function of communicating with the IC card 160, that is, a reader/writer (R/W) function. The IC card 160 is a card that is capable of performing proximity communication and is provided with an IC having a communication function of performing communication in a contact or non-contact manner, for example, an RFIC (Radio Frequency IC).

The keyword search server 180 receives a request for keyword searching with a specified keyword, for example, an artist name, from the client apparatus 150, performs keyword searching using the specified keyword, and transmits a result of the keyword searching to the client apparatus 150.

For example, if a client specifies a certain artist name as a keyword and makes a request for retrieval of music content of the artist, the keyword search server 180 supplies content of the artist and information about a server at which the content can be purchased, for example, the URL of the server, to the client apparatus 150.

For example, the keyword search server 180 stores pieces of data illustrated in FIG. 10 in a database. Referring to FIG. 10, keyword data such as an artist name that may be specified as a keyword, content, and URL information of a site at which the content can be purchased are associated with one another. The keyword search server 180 performs retrieval processing using these pieces of data illustrated in FIG. 10 in response to a keyword search request transmitted from the client apparatus 150, and supplies information about content and information (URL) about a server at which the content can be purchased to the client apparatus 150 as a retrieval result.

A processing sequence according to this embodiment will be described with reference to FIG. 11. FIG. 11 illustrates processing steps (S31 to S38) in chronological order of login processing step (S31) in which a user logs into the client apparatus 150 using the IC card 160 to content download processing step (S38) in which content is downloaded from the content-purchase server 130. Each of processing steps will be described.

First, in step S31, a user performs login processing by holding the IC card 160 owned by the user against or over a reader/writer (R/W) included in the client apparatus 150. As a result of the login processing, the client apparatus 150 reads out a user ID from the IC card. In step S32, the client apparatus 150 accesses the content-management server 120 by transmitting the user ID to the content management server 120 so as to acquire data of a list of the user's pieces of content or content units managed by the content-management server 120, and displays the acquired list data on the display screen thereof. For example, the displayed data is as illustrated in FIG. 2(*b*).

In step S33, the user causes the client apparatus 150 to access the information providing server 110 so as to acquire information provided by the information providing server 110, for example, television program table information in this embodiment, and display the acquired information on the display screen of the client apparatus 150. For example, the list of programs on different television channels that has been described with reference to FIG. 3(*c*) is displayed. The program information includes program title information, cast information, and theme song information.

In step S34, the user selects program information of interest from among pieces of program information included in the television program table information, and outputs a request for keyword searching with a specified keyword, for example, an artist name included in the selected program information, to the keyword search server 180.

The above-described processing is performed in the same manner as described previously with reference to FIG. 3(*c*). That is, the user selects or clicks the program information and drags and drops the program information onto an icon displayed in the IC card management toolbar 151, by the user manipulating an input device for example, whereby the above-described processing is performed. An example of the processing will be described with reference to FIG. 12. Like the case described previously with reference to FIGS. 2 and 3, FIG. 12 illustrates the IC card management toolbar 151 and data displayed in the server information display area 152 set in the client apparatus 150.

The user selects a program of interest from among pieces of program information which are provided by the information-providing server 110 and are displayed in the server information display area 152, selects or clicks the selected program information, and drags and drops the program information onto a keyword search button 159 that is an icon displayed in the IC card management toolbar 151, by the user manipulating an input device for example. As a result, a program associated with the keyword search button 159 is executed, and an artist name, a program title, and a program information ID which are included in the dragged and dropped program information are transmitted to the keyword search server 180 as search keywords.

Referring back to FIG. 11, in step S34, upon receiving the keyword search request from the client apparatus, the keyword search server 180 searches the database storing the pieces of data illustrated in FIG. 10. In step S35, the keyword search server 180 supplies a result of keyword searching with a keyword specified by the user. Thus, content information and information (URL) about a server at which the content can be purchased are communicated to the client apparatus 150.

The search result transmitted from the keyword search server 180 is displayed on the display screen of the client apparatus 150. The user selects content that the user wishes to purchase from among pieces of content included in the search result. The user selects or clicks the selected content and drags and drops the content upon the information acquisition button 154 that is an icon displayed in the IC card management toolbar 151 as described previously with reference to FIG. 3(*c*), by the user manipulating an input device for example. The above-described processing is content purchase instruction processing in step S36.

Subsequently, a program associated with the information acquisition button 154 is started. The client apparatus 150 accesses the content-purchase server 130 on the basis of an URL included in the dragged and dropped data so as to transmit a user ID and content information included in the dragged and dropped data to the content-purchase server 130. The above-described processing is purchase content specification processing in step S37.

In step S38, the content-purchase server 130 transmits content requested by the user to the client apparatus 150 in response to the content purchase request.

Various display settings of the client apparatus 150 can be implemented in embodiments of the present technology. For example, as described previously with reference to FIGS. 2 and 3, the IC card management toolbar and information provided by a server are generated on a display. Alternatively, as described previously with reference to FIG. 7, a plurality of pieces of server information are generated in parallel on a common display screen but the IC card management toolbar is not displayed. In some embodiments, the method of initiating processing by dragging and dropping a part of information provided by a server onto an icon can serve as a method to start a program associated with an icon displayed in a toolbar or a script (for example, Java (registered trademark) script) associated with an icon that is downloaded from a server.

In the processing sequence described previously with reference to FIG. 11, the client apparatus 150 directly requests the keyword search server 180 to perform keyword searching. However, as illustrated in step S34*b* in FIG. 13, the content-management server 120 may receive a keyword search request from the client apparatus 150 and transfer the received keyword search request to the keyword search server 180.

In step S34*b*, the content-management server 120 receives a keyword search request from the client apparatus 150 and then transmits a search keyword and client information that have been received from the client apparatus 150 to the keyword search server 180. Upon receiving the keyword search request, the keyword search server 180 searches a database storing the pieces of data described previously with reference to FIG. 10. In step S35, the keyword search server 180 supplies a result of keyword searching with a keyword specified by the user, that is, content information and information (URL) about a server at which the content can be purchased, to the client apparatus 150. The subsequent processing steps are the same as those described previously with reference to FIG. 11.

Next, example configurations of the information-providing server 110, the content-management server 120, the content-purchase server 130, the client apparatus 150, and the IC card 160, which are included in an information processing system according to the present invention, will be described with reference to FIG. 14.

Information-Providing Server 110

The information-providing server 110 includes a provision information database 111 storing information to be provided for a client, for example, a television program table, and a network server control unit such as a Web server control unit 112 for generating a Web page and providing the generated Web page for the client apparatus 150. Although not illustrated in the drawing, the information-providing server 110 also includes memory and/or a storage unit for storing various data processing programs or parameters and a control unit that has a program execution function and includes a CPU with one or more processors for executing the stored instructions and data that control the processes, methods and algorithms discussed in more detail herein. The servers will also typically include one or more network communications devices for transmitting and receiving data via a network.

Content-Management Server 120

The content-management server 120 includes a content management database 121 storing content owned by a user of the client apparatus 150, a network server control unit such as a Web server control unit 122 for generating a Web page and providing the generated Web page for the client apparatus 150, and a site linkage script generation unit 123 for generating a script specifying processing that is performed on the basis of information received from another server such as the information-providing server 110 as an input value. For example, script generation unit may supply one or more Java (registered trademark) scripts. Although not illustrated in the drawing, the content-management server 120 also includes memory and/or a storage unit for storing various data processing programs or parameters and a control unit that has a program execution function and includes a CPU with one or more processors for executing the stored instructions and data that control the processes, methods and algorithms discussed in more detail herein. The servers will also typically include one or more network communications devices for transmitting and receiving data via a network.

Keyword Search Server 180

The keyword search server 180 includes a content information database 181 storing content information used for content retrieval, a network server control unit such as a Web server control unit 182 for generating a Web page and providing the generated Web page for the client apparatus 150, and a site linkage script generation unit 183 for generating a script specifying processing that is performed on the basis of information received from another server as an input value, for example, a Java (registered trademark) script. Although not illustrated in the drawing, the keyword search server 180 also includes memory and/or a storage unit for storing various data processing programs or parameters and a control unit that has a program execution function and includes a CPU with one or more processors for executing the stored instructions and data that control the processes, methods and algorithms discussed in more detail herein. The servers will also typically include one or more network communications devices for transmitting and receiving data via a network.

Content-Purchase Server 130

The content purchase server 130 includes a content database 131 storing content, a purchase processing unit 132 for performing processing in response to a content purchase request transmitted from the client apparatus 150, and a network server control unit such as a Web server control unit 133 for generating a Web page and providing the generated Web page for the client apparatus 150. Although not illustrated in the drawing, the content purchase server 130 also includes a memory and/or storage unit for storing various data processing programs or parameters and a control unit that has a program execution function and includes a CPU with one or more processors for executing the stored instructions and data that control the processes, methods and algorithms discussed in more detail herein. The servers will also typically include one or more network communications devices for transmitting and receiving data via a network.

Client Apparatus 150

The client apparatus 150 includes a network client such as a Web client 201 that is an program used to view network or Web information supplied via a network from the information-providing server 110, the content-management server 120, or the content-purchase server 130 and functions as a system for displaying or outputting an HTML document, an image, a moving image, or sound on a Web server, a communication unit 202 for performing proximity noncontact (e.g., wireless) or contact (e.g., wired) communication with the IC card 160 and/or wired or wireless network communication, a control unit 203 or CPU for performing communication control and controlling acquisition or storage of data from or in a memory and/or storage unit 204. The storage unit 204 may record or contain data input from the IC card 160, information provided by each server, and a processing program (e.g., software, data and/or processor control instructions for controlling the processes, methods and algorithms discussed in more detail herein such as the described graphic user interfaces and related processing). The Web client 201 includes a display unit and a sound output unit. It may also include other input/output components such as a touch screen, mouse, keypad, etc.

For example, the control unit 203 included in the client apparatus 150 performs data processing on the basis of operation information for information displayed on the display unit. More specifically, if information provided by the information providing server, for example, television program table information, is displayed in a first data display area in the display unit and information selected from among pieces of information included in the television program table information is dragged and dropped onto an icon that is included in an IC card management tool bar or displayed information of another server in a second data display area in the display unit, such as with an input device of the apparatus, the control unit 203 performs processing for transmitting via the communication unit 202 to the content management server or the content purchase server a content purchase request including content specification information generated on the basis of the selected information.

IC Card 160

The IC card 160 includes a communication unit 161 for performing proximity noncontact (e.g., wireless) or contact (e.g., wired) communication with the client apparatus 150, a control unit 162 for performing communication control and controlling acquisition or storage of data from or in a storage unit 163, and the storage unit 163 recording data input from another apparatus, a card ID, and a processing program.

In an example illustrated in FIG. 14, a site linkage script generation unit for generating, for example, a Java (registered trademark) script is disposed in the content-management server 120 and the keyword search server 180. This disposition of the site linkage script generation unit corresponds to the case described previously with reference to FIG. 7 in which pieces of information provided by a plurality of servers are displayed in parallel, such as in a common display interface or window or in proximate display interfaces or windows, and a script is embedded into displayed data of one of the servers.

If the IC card management toolbar 151 described previously with reference to FIGS. 2 and 3 is used, software or a program associated with an icon displayed in the IC card management toolbar 151 is made to execute on the basis of data included in information provided by a server in the client apparatus 150. That is, the client apparatus 150 transmits a processing request to a second server on the basis of information provided by a first server different from the second.

In this case, as illustrated in FIG. 15, a site linkage control unit 205 can be disposed in the client apparatus 150, and the site linkage control unit 205 performs the above-described processing to for example, specify different server URLs. It can be therefore unnecessary to dispose a site linkage script generation unit in the content-management server 120 and the keyword search server 180 for specifying the different server URLs.

The present invention has been described in detail with reference to specific embodiments. However, it is obvious that modifications and substitutions of the embodiments can be made by those skilled in the art without departing from the scope of the present invention. That is, the present invention has been disclosed in conjunction with the embodiments, and the details of this specification should not be restrictively interpreted. The scope of the present invention should be interpreted in consideration of the scope of the appended claims.

The above-described processing flow, algorithms or methods can be performed by hardware, software, or the combination thereof. If the processing flow is performed by software, a program recording a processing sequence is installed in a memory included in a computer embedded in a piece of dedicated hardware or on a general-purpose computer that is allowed to perform various processing operations by installing various programs thereon such that the general-purpose computer may be transformed to a specific-purpose computer. For example, the program or software may be recorded on a program or software recording medium in advance of execution. The program or software may be installed from the above-described recording medium on a computer. Alternatively, a computer may receive a program or software via a network such as a LAN (Local Area Network) or the Internet and install the received program or software on an internal recording medium such as a hard disk.

Moreover, although the processing operations described in this specification may be executed in a chronological order as previously described, the processing operations may be executed concurrently or individually as appropriate. For example, processing order may be determined by the processing power of an apparatus that executes the processes. In this specification, a system means a logical group of a plurality of apparatuses. These apparatuses may not be in the same cabinet.

As described previously, according to an embodiment of the present invention, if a user views information provided by an information-providing server, for example, television program table information, and acquires content related to information selected from among pieces of information included in the television program table information, the user can transmit a content acquisition request including content specification information to a content-providing server simply by dragging and dropping the selected information displayed on a display screen onto a toolbar included in a display unit or onto another server information display area, such that the dragging and dropping may initiate the content acquisition processing without any further user intervention. As a result, the user can effectively perform the selection and acquisition of content without switching between connections to various servers.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing apparatus, comprising:
a display device; and
one or more processors, wherein the information processing apparatus is connected to a plurality of servers via a communication network, wherein the plurality of servers includes an information-providing server, a content-management server, and a content-purchase server, and wherein the one or more processors are programmed to:
acquire a user identification (ID) from an Integrated Circuit (IC) card;
transmit the user ID acquired from the IC card to the content-management server;
receive from the information-providing server a first plurality of pieces of information comprising listing of contents;
receive from the content-management server a second plurality of pieces of information on user content information, wherein the second plurality of pieces of information are retrieved by the content-management server based on the user ID and comprises listing of contents of a user;
display the first plurality of pieces of information provided by the information-providing server in a first data display area on the display device, in parallel with the second plurality of pieces of information provided by the content-management server in a second data display area on the display device;
receive a first piece of information of the first plurality of pieces of information via a graphical user interface from the user by controlling a drag and drop operation of the first piece of information of the first plurality of pieces of information from the first data display area onto an icon in the second data display area, wherein the icon is associated with server specification information that specifies one of the content-management server or the content-purchase server;
determine whether the server specification information specifies the content-management server or the content-purchase server in response to the drag and drop operation;
transmit a content purchase request of the first piece of information to the one of the content-management server or the content-purchase server based on a uniform resource locator (URL) and based on the determination of the server specification information by executing a script associated with the icon, wherein the URL is specified by the script; and
receive from the content-purchase server a content associated with the first piece of information in response to the content purchase request.

2. The information processing apparatus of claim 1, wherein the one or more processors are further programmed to:
acquire one of a password or an electronic certification from the IC card;
transmit the one of the password or the electronic certification acquired from the IC card to the content-management server; and
display the second plurality of pieces of information, provided by the content-management server on the display device, based on the one of the password or the electronic certification.

3. The information processing apparatus of claim 1, wherein the the content purchase request is transmitted to the one of the content-management server or the content-purchase server further based on the user ID.

4. The information processing apparatus of claim 1, wherein the one or more processors are further programmed to:
acquire one of a password or an electronic certification from the IC card;
transmit the one of the password or the electronic certification to the content-management server; and
display the second plurality of pieces of information, provided by the content-management server in the second data display area, based on the one of the password or the electronic certification,
wherein the content purchase request is transmitted to the one of the content-management server or the content-purchase server further based on the one of the password or the electronic certification.

5. An information processing method, comprising:
in an information processing apparatus comprising one or more processors, wherein the information processing apparatus is connected to one or more a plurality of servers via a communication network, wherein the plurality of servers includes an information-providing server, a content-management server, and a content-purchase server:
acquiring, by the information processing apparatus, a user identification (ID) from an Integrated Circuit (IC) card via a proximity communication unit;
transmitting, by the information processing apparatus, the user ID acquired from the IC card to the content-management server;
receiving, by the information processing apparatus, from the information-providing server a first plurality of pieces of information comprising listing of contents;
receiving, by the information processing apparatus, from the content-management server a second plurality of pieces of information on user content information, wherein the second plurality of pieces of information are retrieved by the content-management server based on the user ID and comprises listing of contents of a user;

displaying, by the information processing apparatus, the first plurality of pieces of information provided by the information-providing server in a first data display area on a display device, in parallel with the second plurality of pieces of information provided by the content-management server in a second data display area on the display device;

receiving, by the information processing apparatus, a first piece of information of the first plurality of pieces of information via a graphical user interface from the user by controlling a drag and drop operation of the first piece of information of the first plurality of pieces of information from the first data display area onto an icon in the second data display area, wherein the icon is associated with server specification information that specifies one of the content-management server or the content-purchase server;

determining, by the information processing apparatus, whether the server specification information specifies the content-management server or the content-purchase server in response to the drag and drop operation;

transmitting, by the information processing apparatus, a content purchase request of the first piece of information to the one of the content-management server or the content-purchase server based on a uniform resource locator (URL) and based on the determination of the server specification information by executing a script associated with the icon, wherein the URL is specified by the script; and receiving, by the information processing apparatus, from the content-purchase server a content associated with the first piece of information in response to the content purchase request.

6. The information processing method of claim 5, further comprising:

acquiring, by the information processing apparatus, one of a password or an electronic certification from the IC card via the proximity communication unit;

transmitting, by the information processing apparatus, the one of the password or the electronic certification acquired from the IC card to the content-management server; and displaying, by the information processing apparatus, the second plurality of pieces of information provided by the content-management server on the display device, based on the one of the password or the electronic certification.

7. The information processing method of claim 5, wherein the content purchase request is transmitted to the one of the content-management server or the content-purchase server further based on the user ID.

8. The information processing method of claim 5, further comprising:

acquiring, by the information processing apparatus, one of a password or an electronic certification from the IC card via the proximity communication unit;

transmitting, by the information processing apparatus, the one of the password or the electronic certification to the content-management server; and displaying, by the information processing apparatus, the second plurality of pieces of information provided by the content-management server in the second data display area, based on the one of the password or the electronic certification, wherein the content purchase request is transmitted to the one of the content-management server or the content-purchase server based on the one of the password or the electronic certification.

9. A non-transitory computer-readable medium having stored thereon, computer-executable instructions which, when executed by a processor causes an information processing apparatus including the processor to execute operations, the operations comprising:

acquiring a user identification (ID) from an Integrated Circuit (IC) card via a proximity communication unit;

transmitting the user ID acquired from the IC card to a content-management server;

receiving from an information-providing server a first plurality of pieces of information comprising listing of contents;

receiving from the content-management server a second plurality of pieces of information on user content information, wherein the second plurality of pieces of information are retrieved by the content-management server based on the user ID and comprises listing of contents of a user;

displaying the first plurality of pieces of information provided by the information-providing server in a first data display area on a display device, in parallel with the second plurality of pieces of information provided by the content-management server in a second data display area on the display device;

receiving a first piece of information of the first plurality of pieces of information via a graphical user interface from the user by controlling a drag and drop operation of the first piece of information of the first plurality of pieces of information from the first data display area onto an icon in the second data display area, wherein the icon is associated with server specification information that specifies one of the content-management server or a content-purchase server;

determining whether the server specification information specifies the content-management server or the content-purchase server in response to the drag and drop operation;

transmitting a content purchase request of the first piece of information to the one of the content-management server or the content-purchase server based on a uniform resource locator (URL) and based on the determination of the server specification information by executing a script associated with the icon, wherein the URL is specified by the script; and receiving from the content-purchase server a content associated with the first piece of information in response to the content purchase request.

* * * * *